(12) United States Patent
Bhoria et al.

(10) Patent No.: US 11,782,718 B2
(45) Date of Patent: Oct. 10, 2023

(54) IMPLIED FENCE ON STREAM OPEN

(71) Applicant: TEXAS INSTRUMENTS INCORPORATED, Dallas, TX (US)

(72) Inventors: Naveen Bhoria, Plano, TX (US); Kai Chirca, Dallas, TX (US); Timothy D. Anderson, University Park, TX (US); Duc Bui, Grand Prairie, TX (US); Abhijeet A. Chachad, Plano, TX (US); Son Hung Tran, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/216,821

(22) Filed: Mar. 30, 2021

(65) Prior Publication Data

US 2021/0216316 A1    Jul. 15, 2021

Related U.S. Application Data

(60) Continuation of application No. 16/297,824, filed on Mar. 11, 2019, now Pat. No. 10,963,255, which is a (Continued)

(51) Int. Cl.
*G06F 9/30* (2018.01)
*G06F 9/38* (2018.01)
(Continued)

(52) U.S. Cl.
CPC ........ *G06F 9/3016* (2013.01); *G06F 9/30014* (2013.01); *G06F 9/30036* (2013.01); *G06F 9/30043* (2013.01); *G06F 9/30098* (2013.01); *G06F 9/30101* (2013.01); *G06F 9/30112* (2013.01); *G06F 9/30145* (2013.01);
(Continued)

(58) Field of Classification Search
CPC ............. G06F 9/30043; G06F 9/30101; G06F 9/30145; G06F 9/3834; G06F 9/3877
See application file for complete search history.

(56) References Cited

U.S. PATENT DOCUMENTS 5,185,871 A * 2/1993 Frey ...................... G06F 9/3834
                                                        712/205
5,963,972 A    10/1999 Calder et al.
(Continued)

*Primary Examiner* — Tim T Vo
*Assistant Examiner* — Kasim Alli
(74) *Attorney, Agent, or Firm* — Brian D. Graham; Frank D. Cimino

(57) ABSTRACT

Techniques related to executing a plurality of instructions by a processor comprising receiving a first instruction configured to cause the processor to output a first data value to a first address in a first data cache, outputting, by the processor, the first data value to a second address in a second data cache, receiving a second instruction configured to cause a streaming engine associated with the processor to prefetch data from the first data cache, determining that the first data value has not been outputted from the second data cache to the first data cache, stalling execution of the second instruction, receiving an indication, from the second data cache, that the first data value has been output from the second data cache to the first data cache, and resuming execution of the second instruction based on the received indication.

20 Claims, 9 Drawing Sheets

Related U.S. Application Data continuation-in-part of application No. 16/227,238, filed on Dec. 20, 2018, now Pat. No. 11,036,648, which is a continuation of application No. 15/429,205, filed on Feb. 10, 2017, now Pat. No. 10,162,641, which is a division of application No. 14/331,986, filed on Jul. 15, 2014, now Pat. No. 9,606,803.

(60) Provisional application No. 62/786,097, filed on Dec. 28, 2018, provisional application No. 61/846,148, filed on Jul. 15, 2013.

(51) Int. Cl.

| | |
|---|---|
| *G06F 11/00* | (2006.01) |
| *G06F 12/0897* | (2016.01) |
| *G06F 12/0875* | (2016.01) |
| *G06F 9/32* | (2018.01) |
| *G06F 11/10* | (2006.01) |
| *G06F 9/345* | (2018.01) |
| *G06F 12/0811* | (2016.01) |

(52) U.S. Cl.
CPC ............. *G06F 9/32* (2013.01); *G06F 9/345* (2013.01); *G06F 9/3802* (2013.01); *G06F 9/383* (2013.01); *G06F 9/3834* (2013.01); *G06F 9/3867* (2013.01); *G06F 9/3877* (2013.01); *G06F 11/00* (2013.01); *G06F 11/1048* (2013.01); *G06F 12/0875* (2013.01); *G06F 12/0897* (2013.01); *G06F 9/3822* (2013.01); *G06F 11/10* (2013.01); *G06F 12/0811* (2013.01); *G06F 2212/452* (2013.01); *G06F 2212/60* (2013.01)

(56) References Cited

U.S. PATENT DOCUMENTS

| | | | |
|---|---|---|---|
| 5,999,727 A * | 12/1999 | Panwar | G06F 9/384 |
| | | | 712/225 |
| 7,177,985 B1 | 2/2007 | Diefendorff | |
| 7,340,577 B1 * | 3/2008 | Van Dyke | G06F 13/4243 |
| | | | 711/167 |
| 7,523,295 B2 * | 4/2009 | Codrescu | G06F 9/3851 |
| | | | 712/216 |
| 8,671,248 B2 * | 3/2014 | Shen | G06F 12/0842 |
| | | | 711/134 |
| 9,342,310 B2 * | 5/2016 | Palanca | G06F 9/30043 |
| 2004/0044847 A1 * | 3/2004 | Ray | G06F 12/0859 |
| | | | 711/E12.051 |
| 2004/0186960 A1 | 9/2004 | Poggio | |
| 2010/0332800 A1 | 12/2010 | Sunayama | |

* cited by examiner

IMPLIED FENCE ON STREAM OPEN

RELATED APPLICATIONS

This application is a continuation of U.S. patent application Ser. No. 16/297,824, filed Mar. 11, 2019, which claims priority to U.S. Provisional Application No. 62/786,097, filed Dec. 28, 2018, each of which is incorporated by reference herein. Further, U.S. patent application Ser. No. 16/297,824 is a continuation in part of U.S. patent application Ser. No. 16/227,238, filed Dec. 20, 2018, which is a continuation of U.S. patent application Ser. No. 15/429,205, filed Feb. 10, 2017, now issued as U.S. Pat. No. 10,162,641, which is a divisional of U.S. patent application Ser. No. 14/331,986, filed Jul. 15, 2014, now issued as U.S. Pat. No. 9,606,803, which claims priority to U.S. Provisional Application No. 61/846,148, filed Jul. 15, 2013, each of which is incorporated by reference herein.

BACKGROUND

Modern digital signal processors (DSP) faces multiple challenges. Workloads continue to increase, requiring increasing bandwidth. Systems on a chip (SOC) continue to grow in size and complexity. Memory system latency severely impacts certain classes of algorithms. As transistors get smaller, memories and registers become less reliable. As software stacks get larger, the number of potential interactions and errors becomes larger. Even wires become an increasing challenge. Wide busses are difficult to route. Wire speeds continue to lag transistor speeds. Routing congestion is a continual challenge.

Generally, bus bandwidth is proportional to the width of the bus in bits times the bus dock rate. To increase bandwidth to the processor required a wider bus running at a faster clock rate. However, that can lead to more wires and greater latency, because faster clock rates typically require greater pipelining. More wires produce more routing issues. Thus, processor needs tend to lead either to lower clock rates, overly large chips or both.

Memory systems continue to provide scalability challenges to the central processing unit (CPU). For example, in certain CPUs, a level one data (L1D) cache line can be consumed in fewer CPU cycles than it takes to read a new line into the cache. Streaming workloads therefore pay a very large cache penalty even if all their data resides in level two (L2) RAM due to sometimes limited buffering, limits to how many cache lines may be retrieved at a time, and by roundtrip latency ranging from tens to hundreds of processor cycles for various forms of cache and memory. The in-order nature of the CPU limits the ability to hide this latency penalty. A prefetcher can help, but even with a prefetcher, streaming workloads can saturate memory systems over a period of time.

Memory system overhead limits performance, and traditional approaches to solving memory system issues do not necessarily scale well. However, applications continue to demand increasing performance. Future application workloads will not only continue to place more tasks on DSPs, but also have those tasks communicate directly with tasks running under a traditional virtual memory operating system such as running on a traditional general-purpose processor. Larger systems might even include virtualization so that multiple virtual machines need to interact with the DSPs.

SUMMARY

This disclosure relates generally to the field of DSPs. More particularly, but not by way of limitation, aspects of the present disclosure relate to an implied fence on stream open, including a method for executing a plurality of instructions by a processor. This method includes receiving a first instruction configured to cause the processor to output a first data value to a first address in a first data cache. The method also includes outputting, by the processor, the first data value to a second address in a second data cache. The method further includes receiving a second instruction configured to cause a streaming engine associated with the processor to prefetch data from the first data cache. The method also includes determining that the first data value has not been outputted from the second data cache to the first data cache. The method further includes stalling execution of the second instruction. The method also includes stalling execution of the second instruction. The method further includes stalling execution of the second instruction.

Another aspect of the present disclosure relates to a processor comprising a streaming engine capable of autonomously accessing a first data cache and an instruction execution pipeline controller. The instruction execution pipeline controller includes circuitry configured to output the first data value to a second address in a second data cache. The instruction execution pipeline controller also includes circuitry configured to receive a second instruction configured to cause the streaming engine to prefetch data from the first data cache. The instruction execution pipeline controller also include circuitry configured to determine that the first data value has not been outputted from the second data cache to the first data cache. The instruction execution pipeline controller also include circuitry configured to stall execution of the second instruction. The instruction execution pipeline controller also include circuitry configured to receive an indication, from the second data cache, that the first data value has been output from the second data cache to the first data cache. The instruction execution pipeline controller also include circuitry configured to resume execution of the second instruction based on the received indication.

Another aspect of the present disclosure relates to a processing system comprising a memory space and a processor. The processor includes a streaming engine capable of autonomously accessing a first data cache of the memory space and an instruction execution pipeline controller. The instruction execution pipeline controller includes circuitry configured to receive a first instruction configured to cause the processor to output a first data value to a first address in the first data cache, the first instruction associated with a first color value. The circuitry is further configured to output the first data value to a second address in a second data cache of the memory space. The circuitry is further configured to receive a second instruction configured to cause the streaming engine to prefetch data from the first data cache, the second instruction associated with the first color value. The circuitry is further configured to determine that the first data value has not been outputted from the second data cache to the first data cache. The circuitry is further configured to stall execution of the second instruction. The circuitry is further configured to receive an indication, from the second data cache, that the first data value has been output from the second data cache to the first data cache. The circuitry is further configured to resume execution of the second instruction based on the received indication. The circuitry is further configured to receive a third instruction configured to cause the processor to output a third data value to a third address in the first data cache, the third instruction associated with the first color value. The circuitry is further configured to receive a fourth instruction associated with a second color value different from the first color value, the fourth instruction configured to cause the streaming engine to prefetch data from the third address. The circuitry is further configured to execute the fourth instruction without stalling execution of the fourth instruction

BRIEF DESCRIPTION OF THE DRAWINGS

For a detailed description of various examples, reference will now be made to the accompanying drawings in which.

DETAILED DESCRIPTION

Figure 1:
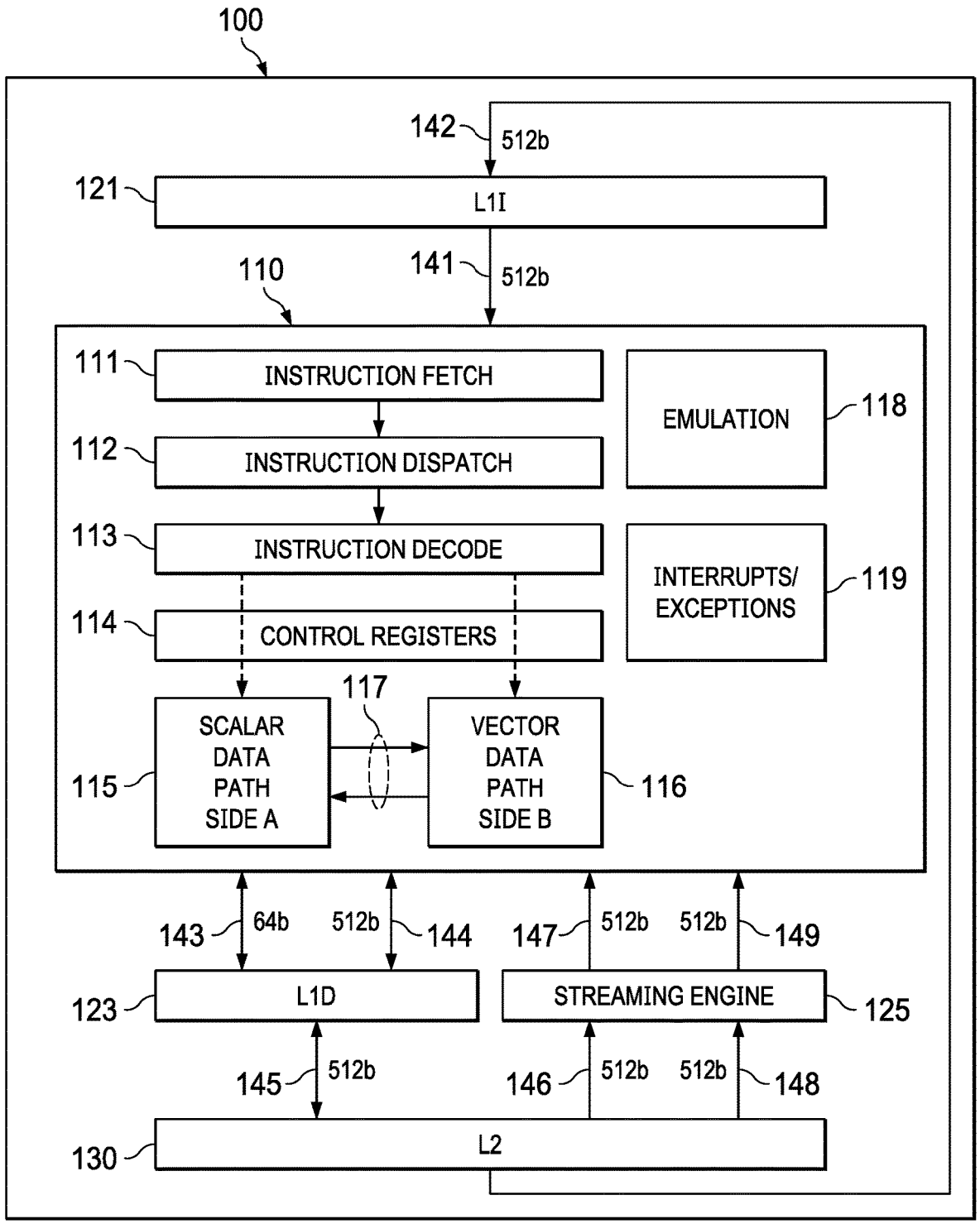
FIG. 1 illustrates an example processor that includes dual scalar/vector data paths.

Digital signal processors (DSP) are optimized for processing streams of data that may be derived from various input signals, such as sensor data, a video stream, a voice channel, radar signals, biomedical signals, etc. Memory bandwidth and scheduling are concerns for digital signal processors operating on real-time data. An example DSP processing core described in this disclosure includes a streaming engine to improve processing efficiency and data scheduling.

Digital signal processors (DSP) are optimized for processing streams of data that may be derived from various input signals, such as sensor data, a video stream, a voice channel, radar signals, biomedical signals, etc. Memory bandwidth and scheduling are concerns for digital signal processors operating on real-time data. The example DSP processing core described hereinbelow includes a streaming engine to improve processing efficiency and data scheduling.

One or more DSP processing cores may be combined with various peripheral circuits, blocks of memory, etc. on a single integrated circuit (IC) die to form a system on chip (SoC). See, for example, "66AK2Hx Multicore Keystone™ DSP+ARM® System-on-Chip," 2013, which is incorporated by reference herein.

In at least one example DSP core of this disclosure, an autonomous streaming engine is coupled to the DSP. In this example, the streaming engine can manage two data streams simultaneously; in another example the streaming engine may be capable of managing only a single stream, while in other examples the streaming engine may be capable of handling more than two streams. In each case, for each stream the streaming engine includes an address generation stage, a data formatting stage, and some storage for formatted data waiting for consumption by the processor. In the examples described hereinbelow, addresses are derived from algorithms that can involve multi-dimensional loops, each dimension maintaining an iteration count. In one example, the streaming engine supports six levels of nested iteration. In other examples, more or fewer levels of iteration may be supported.

In one or more examples of this disclosure, a processing core within a given family may have a different number of instruction pipeline stages, depending on a particular technology and cost/performance tradeoffs. The example described here is representative and includes multiple pipelines stages.

In the drawings, like elements are denoted by like reference numerals for consistency.

An example DSP core is described in detail hereinbelow with reference to FIGS. 1-4. A streaming engine capable of managing two data streams using six-dimensional nested loops is described in detail hereinbelow with reference to FIGS. 5-10.

FIG. 1 illustrates an example processor 100 that includes dual scalar/vector data paths 115, 116. Processor 100 includes separate level one instruction cache (L1I) 121 and level one data cache (L1D) 123. Processor 100 includes a L2 combined instruction/data cache (L2) 130 that holds both instructions and data. FIG. 1 illustrates connection between L1I cache and L2 combined instruction/data cache 130 by way of 512-bit bus 142. FIG. 1 illustrates connection between L1D cache 123 and L2 combined instruction/data cache 130 by way of 512-bit bus 145. In this example of processor 100, L2 combined instruction/data cache 130 stores instructions to back up L1I cache 121 and data to back up L1D cache 123. In this example L2 combined instruction/data cache 130 is further connected to higher level cache and/or main memory using known or later developed memory system techniques but not illustrated in FIG. 1. The size of L1I cache 121, L1D cache 123, and L2 cache 130 may be implemented in different sizes in various examples; in this example, L1I cache 121 and L1D cache 123 are each 32 kilobytes, and L2 cache 130 is 1024 kilobytes. In this example central processing unit core 110, L1I cache 121, L1D cache 123 and L2 combined instruction/data cache 130 are formed on a single integrated circuit. In some examples, the integrated circuit described above includes other circuits.

Central processing unit core 110 fetches instructions from L1I cache 121 as controlled by instruction fetch unit 111. Instruction fetch unit 111 determines the next instructions to be executed and recalls a fetch packet sized set of such instructions. The nature and size of fetch packets are further detailed below. Instructions are directly fetched from L1I cache 121 upon a cache hit (if these instructions are stored in L1I cache 121). Upon a cache miss (the specified instruction fetch packet is not stored in L1I cache 121), these instructions are sought in L2 combined cache 130. In this example the size of a cache line in L1I cache 121 equals the size of a fetch packet, which is 512 bits. The memory locations requested by these instructions are either a hit in L2 combined cache 130 or a miss. A hit is serviced from L2 combined cache 130. A miss is serviced from a higher level of cache (not illustrated) or from main memory (not illustrated). In this example, the requested instruction is simultaneously supplied to both L1I cache 121 and central processing unit core 110 to speed use.

In the example illustrated in FIG. 1, central processing unit core 110 includes plural functional units to perform instruction specified data processing tasks. Instruction dispatch unit 112 determines the target functional unit of each fetched instruction. In this example central processing unit 110 operates as a very long instruction word (VLIW) processor capable of operating on plural instructions in corresponding functional units simultaneously. In some examples, a complier organizes instructions in execute packets that are executed together. Instruction dispatch unit 112 directs each instruction to its target functional unit. The functional unit assigned to an instruction is completely specified by the instruction produced by a compiler. The hardware of central processing unit core 110 does not assign functional units. In this example instruction dispatch unit 112 may operate on several instructions in parallel. The number of such parallel instructions is set by the size of the execute packet. This will be further detailed hereinbelow.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. As further explained below, instructions may include a constant field in place of one register number operand field. The result of this decoding are control signals which cause the target functional unit to perform the data processing operation specified by the corresponding instruction on the specified data.

Central processing unit core 110 includes control registers 114. Control registers 114 store information for control of the functional units in scalar data path side A 115 and vector data path side B 116. This information may include mode information or the like.

The decoded instructions from instruction decode unit 113, and information stored in control registers 114, are supplied to scalar data path side A 115 and vector data path side B 116. As a result, functional units within scalar data path side A 115 and vector data path side B 116 perform instruction specified data processing operations upon instruction specified data and store the results in an instruction specified data register or registers. Each of scalar data path side A 115 and vector data path side B 116 include plural functional units that operate in parallel. Scalar data path side A 115, vector data path side B 116, and their plural functional units will be further detailed below in conjunction with FIG. 2. There is a data path 117 between scalar data path side A 115 and vector data path side B 116 permitting data exchange.

Central processing unit core 110 includes further non-instruction-based modules. Emulation unit 118 permits determination of the machine state of central processing unit core 110 in response to instructions. This capability will typically be employed for algorithmic development. Interrupts/exceptions unit 119 enables central processing unit core 110 to be responsive to external, asynchronous events (interrupts) and to respond to attempts to perform improper operations (exceptions).

Processor 100 includes streaming engine 125. Streaming engine 125 supplies two data streams from predetermined addresses typically cached in L2 combined cache 130 to register files of vector data path side B of central processing unit core 110. This provides controlled data movement from memory (as cached in L2 combined cache 130) directly to functional unit operand inputs.

FIG. 1 illustrates example data widths of busses between various parts. L1I cache 121 supplies instructions to instruction fetch unit 111 via bus 141. Bus 141 is a 512-bit bus in this example. Bus 141 is unidirectional from L1I cache 121 to central processing unit 110. L2-combined-cache 130 supplies instructions to L1I cache 121 via bus 142. Bus 142 is a 512-bit bus in this example. Bus 142 is unidirectional from L2 combined cache 130 to L1I cache 121.

L1D cache 123 exchanges data with register files in scalar data path side A 115 via bus 143. Bus 143 is a 64-bit bus in this example. L1D cache 123 exchanges data with register files in vector data path side B 116 via bus 144. Bus 144 is a 512-bit bus in this example. Busses 143 and 144 are illustrated as bidirectional supporting both central processing unit 110 data reads and data writes. L1D cache 123 exchanges data with L2 combined cache 130 via bus 145. Bus 145 is a 512-bit bus in this example. Bus 145 is illustrated as bidirectional supporting cache service for both central processing unit 110 data reads and data writes.

Processor data requests are fetched directly from L1D cache 123 upon a cache hit (if the requested data is stored in L1D cache 123). Upon a cache miss (the specified data is not stored in L1D cache 123), this data is sought in L2 combined cache 130. As noted previously, the memory locations of this requested data are either a hit in L2 combined cache 130 or a miss. A hit is serviced from L2 combined cache 130. A miss is serviced from another level of cache (not illustrated) or from main memory (not illustrated). The requested data may be simultaneously supplied to both L1D cache 123 and central processing unit core 110 to speed the use of the requested data.

L2 combined cache 130 supplies data of a first data stream to streaming engine 125 via bus 146. Bus 146 is a 512-bit bus in this example. Streaming engine 125 supplies data of this first data stream to functional units of vector data path side B 116 via bus 147. Bus 147 is a 512-bit bus in this example. L2 combined cache 130 supplies data of a second data stream to streaming engine 125 via bus 148. Bus 148 is a 512-bit bus in this example. Streaming engine 125 supplies data of this second data stream to functional units of vector data path side B 116 via bus 149, which is a 512-bit bus in this example. Busses 146, 147, 148 and 149 are illustrated as unidirectional from L2 combined cache 130 to streaming engine 125 and to vector data path side B 116 in accordance with this example.

Streaming engine data requests are directly fetched from L2 combined cache 130 upon a cache hit (if the requested data is stored in L2 combined cache 130). Upon a cache miss (the specified data is not stored in L2 combined cache 130), this data is sought from another level of cache (not illustrated) or from main memory (not illustrated). It is technically feasible in some examples for L1D cache 123 to cache data not stored in L2 combined cache 130. If such operation is supported, then upon a streaming engine data request that is a miss in L2 combined cache 130, L2 combined cache 130 may snoop L1D cache 123 for the streaming engine requested data. If L1D cache 123 stores this data its snoop response would include the data, which is then supplied to service the streaming engine request. If L1D cache 123 does not store this data, its snoop response would indicate this and L2 combined cache 130 would then service this streaming engine request from another level of cache (not illustrated) or from main memory (not illustrated).

Figure 2:
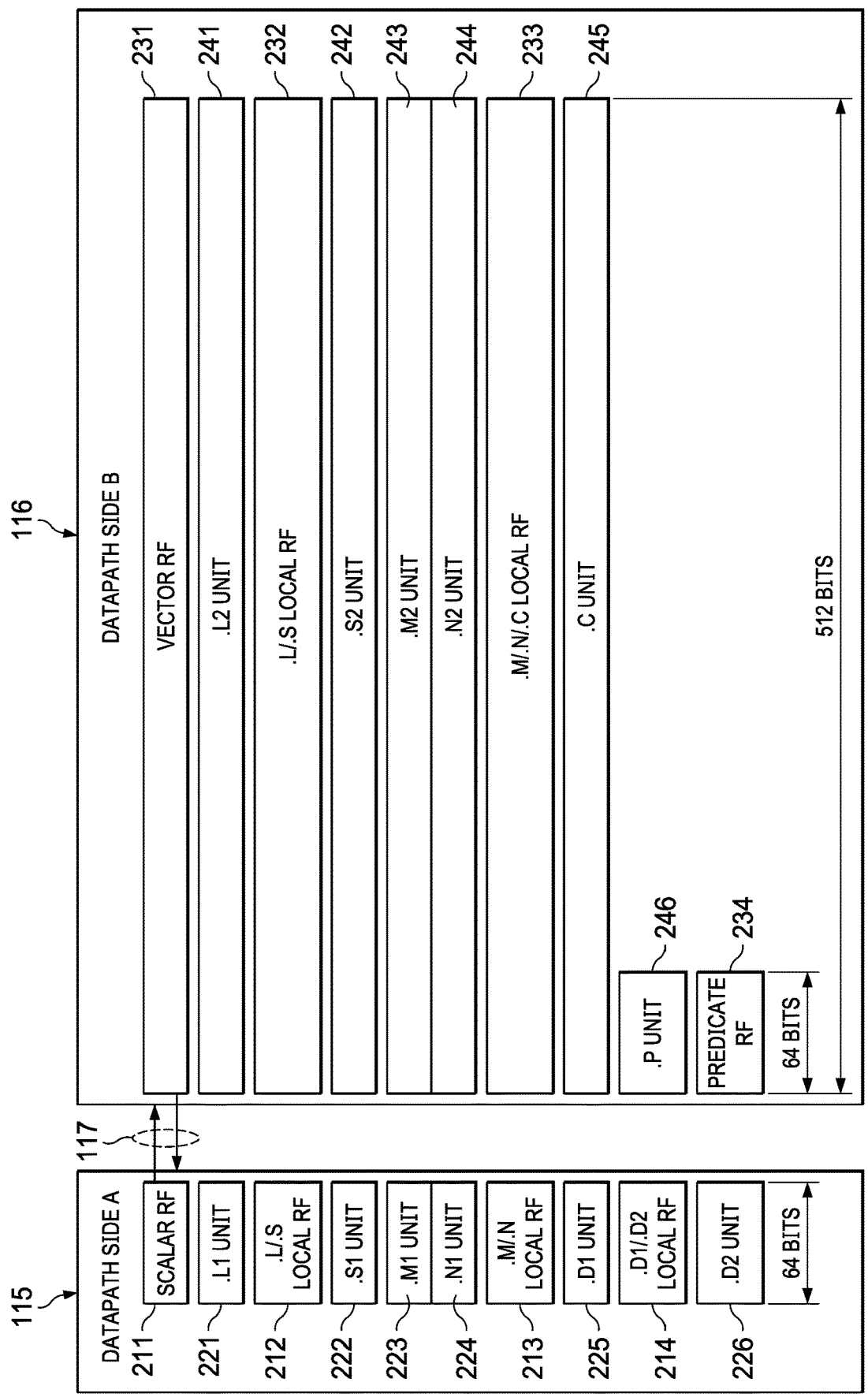
FIG. 2 illustrates details of functional units and register files of the example processor.

FIG. 2 illustrates further details of functional units and register files within scalar data path side A 115 and vector data path side B 116. Scalar data path side A 115 includes L1 unit 221, S1 unit 222, M1 unit 223, N1 unit 224, D1 unit 225 and D2 unit 226. Scalar data path side A 115 includes global scalar register file 211, L1/S1 local register file 212, M1/N1 local register file 213 and D1/D2 local register file 214. Vector data path side B 116 includes L2 unit 241, S2 unit 242, M2 unit 243, N2 unit 244, C unit 245 and P unit 246. Vector data path side B 116 includes global vector register file 231, L2/S2 local register file 232, M2/N2/C local register file 233 and predicate register file 234. There are limitations upon which functional units may read from or write to which register files. These will be described in more detail hereinbelow.

Scalar data path side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 may perform the following instruction selected operations: 64-bit add/subtract operations; 32-bit min/max operations; 8-bit Single Instruction Multiple Data (SIMD) instructions such as sum of absolute value, minimum and maximum determinations, circular min/max operations, and various move operations between register files. The result may be written into an instruction specified register of global scalar register file 211, L1/S1 local register file 212, M1/N1 local register file 213 or D1/D2 local register file 214.

Scalar data path side A 115 includes S1 unit 222. S1 unit 222 generally accepts two 64-bit operands and produces one 64-bit result. The two operands are each recalled from an instruction specified register in either global scalar register file 211 or L1/S1 local register file 212. In this example, S1 unit 222 performs the same type of operations as L1 unit 221. In another example, there might be slight variations between the data processing operations supported by L1 unit 221 and S1 unit 222. The result may be written into an instruction specified register of global scalar register file 211, L1/S1 local register file 212, M1/N1 local register file 213 or D1/D2 local register file 214.

Scalar data path side A 115 includes M1 unit 223. M1 unit 223 generally accepts two 64-bit operands and produces one 64-bit result. The two operands are each recalled from an instruction specified register in either global scalar register file 211 or M1/N1 local register file 213. In this example, M1 unit 223 performs the following instruction selected operations: 8-bit multiply operations; complex dot product operations; 32-bit bit count operations; complex conjugate multiply operations; and bitwise logical operations, moves, adds and subtracts. The result may be written into an instruction specified register of global scalar register file 211, L1/S1 local register file 212, M1/N1 local register file 213 or D1/D2 local register file 214.

Scalar data path side A 115 includes N1 unit 224. N1 unit 224 generally accepts two 64-bit operands and produces one 64-bit result. The two operands are each recalled from an instruction specified register in either global scalar register file 211 or M1/N1 local register file 213. In this example, N1 unit 224 performs the same type operations as M1 unit 223. There may be certain double operations (called dual issued instructions) that employ both the M1 unit 223 and the N1 unit 224 together. The result may be written into an instruction specified register of global scalar register file 211, L1/S1 local register file 212, M1/N1 local register file 213 or D1/D2 local register file 214.

Scalar data path side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64-bits. D2 unit 226 is used for vector loads and stores of 512-bits. In this example, D1 unit 225 and D2 unit 226 also perform: swapping, pack and unpack on the load and store data; 64-bit single instruction, multiple data arithmetic operations; and 64-bit bitwise logical operations. D1/D2 local register file 214 will generally store base and offset addresses used in address calculations for the corresponding loads and stores.

The two operands are each recalled from an instruction specified register in either global scalar register file 211 or D1/D2 local register file 214. The calculated result may be written into an instruction specified register of global scalar register file 211, L1/S1 local register file 212, M1/N1 local register file 213 or D1/D2 local register file 214.

Vector data path side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. In this example, L2 unit 241 performs instruction similar to L1 unit 221 except on wider 512-bit data. The result may be written into an instruction specified register of global vector register file 231, L2/S2 local register file 232, M2/N2/C local register file 233 or predicate register file 234.

Vector data path side B 116 includes S2 unit 242. S2 unit 242 generally accepts two 512-bit operands and produces one 512-bit result. The two operands are each recalled from an instruction specified register in either global vector register file 231, L2/S2 local register file 232 or predicate register file 234. In this example, S2 unit 242 performs instructions similar to S1 unit 222. The result may be written into an instruction specified register of global vector register file 231, L2/S2 local register file 232, M2/N2/C local register file 233 or predicate register file 234.

Vector data path side B 116 includes M2 unit 243. M2 unit 243 generally accepts two 512-bit operands and produces one 512-bit result. The two operands are each recalled from an instruction specified register in either global vector register file 231 or M2/N2/C local register file 233. In this example, M2 unit 243 performs instructions similarly to M1 unit 223 except on wider 512-bit data. The result may be written into an instruction specified register of global vector register file 231, L2/S2 local register file 232 or M2/N2/C local register file 233.

Vector data path side B 116 includes N2 unit 244. N2 unit 244 generally accepts two 512-bit operands and produces one 512-bit result. The two operands are each recalled from an instruction specified register in either global vector register file 231 or M2/N2/C local register file 233. In this example, N2 unit 244 performs the same type operations as M2 unit 243. There may be certain double operations (called dual issued instructions) that employ both M2 unit 243 and the N2 unit 244 together. The result may be written into an instruction specified register of global vector register file 231, L2/S2 local register file 232 or M2/N2/C local register file 233.

Streaming engine 125 (FIG. 1) transfers data in certain restricted circumstances. Streaming engine 125 controls two data streams. A stream includes of a sequence of elements of a particular type. Programs that operate on streams read the data sequentially, operating on each element in turn. Every stream has the following basic properties: the stream data has a well-defined beginning and ending in time; the stream data has a fixed element size and type throughout the stream; the stream data has a fixed sequence of elements. Thus, programs cannot seek randomly within the stream. The stream data is read only while active. Programs cannot write to a stream while simultaneously reading from it. Once a stream is opened, streaming engine 125 performs the following operations: calculates the address; fetches the defined data type from L2 unified cache 130 (which may require cache service from a higher-level memory, e.g., in the event of a cache miss in L2); performs data type manipulation such as zero extension, sign extension, data element sorting/swapping such as matrix transposition; and delivers the data directly to the programmed data register file within processor core 110. Streaming engine 125 is thus useful for real time digital filtering operations on well behaved data. Streaming engine 125 frees these memory fetch tasks from the corresponding processor enabling other processing functions.

Streaming engine 125 provides several benefits. For example, streaming engine 125 permits multi-dimensional memory accesses. Streaming engine 125 increases the available bandwidth to the functional units. Streaming engine 125 reduces the number of cache miss stalls since the stream buffer bypasses L1D cache 123. Streaming engine 125 reduces the number of scalar operations required to maintain a loop. Streaming engine 125 manages address pointers. Streaming engine 125 handles address generation automatically freeing up the address generation instruction slots and D1 unit 225 and D2 unit 226 for other computations.

Processor core 110 (FIG. 1) operates on an instruction pipeline. Instructions are fetched in instruction packets of fixed length further described below. All instructions require the same number of pipeline phases for fetch and decode but require a varying number of execute phases.

Figure 3:
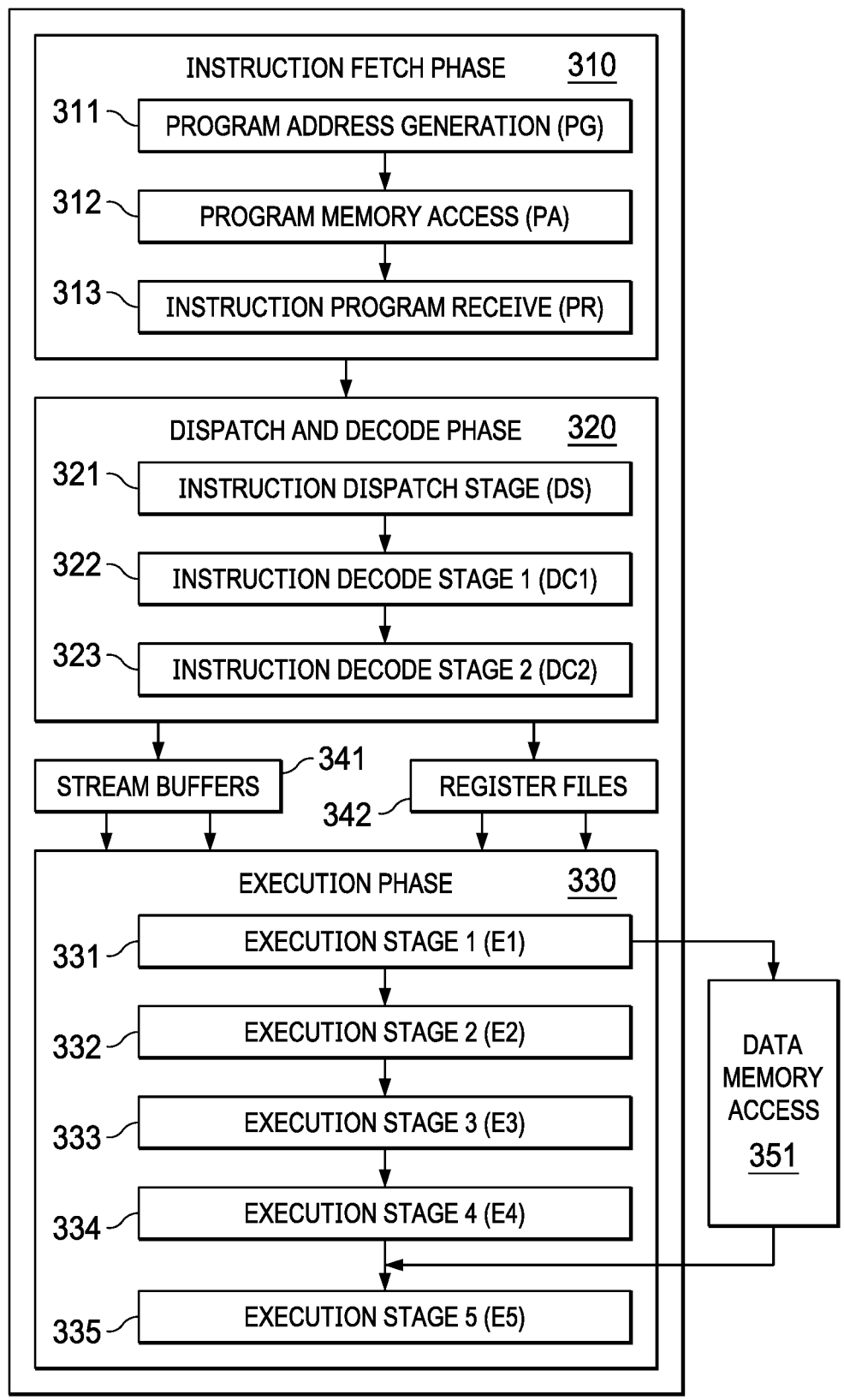
FIG. 3 illustrates multiple pipeline phases.

FIG. 3 illustrates the following pipeline phases: program fetch phase 310, dispatch and decode phases 320 and execution phases 330. Program fetch phase 310 includes three stages for all instructions. Dispatch and decode phases 320 include three stages for all instructions. Execution phase 330 includes one to four stages dependent on the instruction.

Fetch phase 310 includes program address generation (PG) stage 311, program access (PA) stage 312 and program receive (PR) stage 313. During program address generation stage 311, the program address is generated in the processor and the read request is sent to the memory controller for the L1I cache. During the program access stage 312 the L1I cache processes the request, accesses the data in its memory and sends a fetch packet to the processor boundary. During the program receive stage 313 the processor registers the fetch packet.

Figure 4:
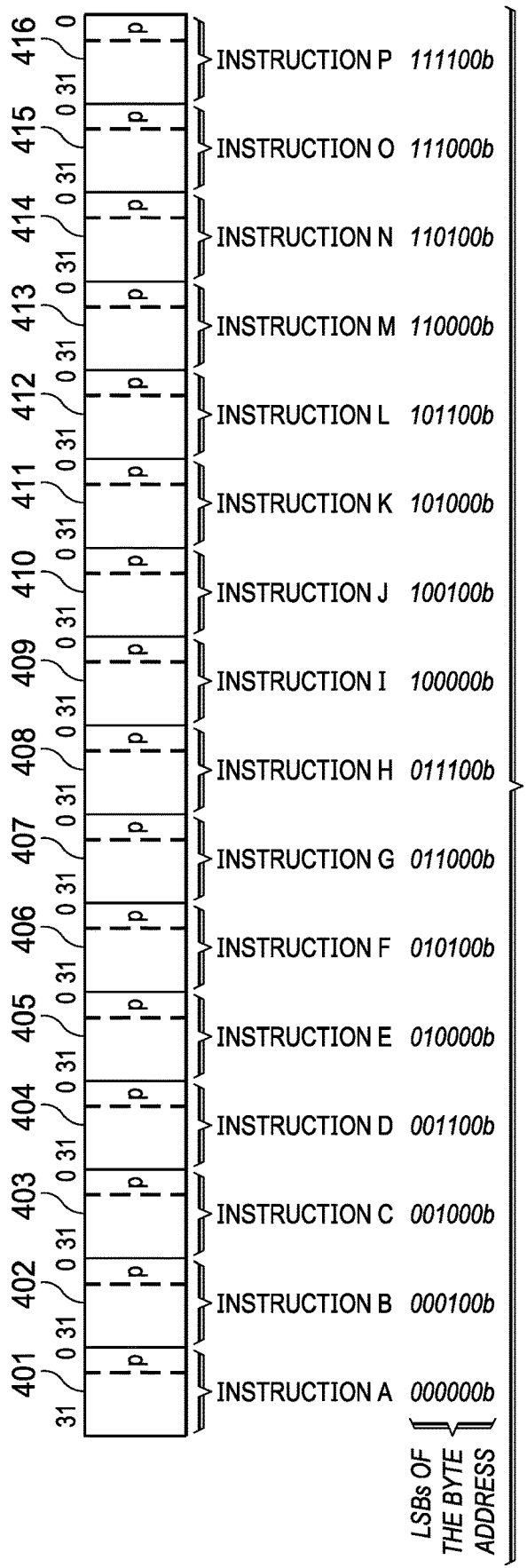
FIG. 4 illustrates sixteen instructions of a single fetch packet.

Instructions are fetched in a fetch packet that includes sixteen 32-bit wide words. FIG. 4 illustrates sixteen instructions 401 to 416 of a single fetch packet. Fetch packets are aligned on 512-bit (16 word) boundaries. This example employs a fixed 32-bit instruction length. Fixed length instructions are advantageous for several reasons. Fixed length instructions enable easy decoder alignment. A properly aligned instruction fetch can load multiple instructions into parallel instruction decoders. Such a properly aligned instruction fetch can be achieved by predetermined instruction alignment when stored in memory by having fetch packets aligned on 512-bit boundaries coupled with a fixed instruction packet fetch. Conversely, variable length instructions require an initial step of locating each instruction boundary before they can be decoded. A fixed length instruction set generally permits more regular layout of instruction fields. This simplifies the construction of each decoder which is an advantage for a wide issue VLIW central processor.

Processor core 110 (FIG. 1) and L1I cache 121 pipelines (FIG. 1) are decoupled from each other. Fetch packet returns from L1I cache can take a different number of clock cycles, depending on external circumstances such as whether there is a hit in L1I cache 121 or a hit in L2 combined cache 130. Therefore, program access stage 312 can take several clock cycles instead of one clock cycle as in the other stages.

Figure 5:
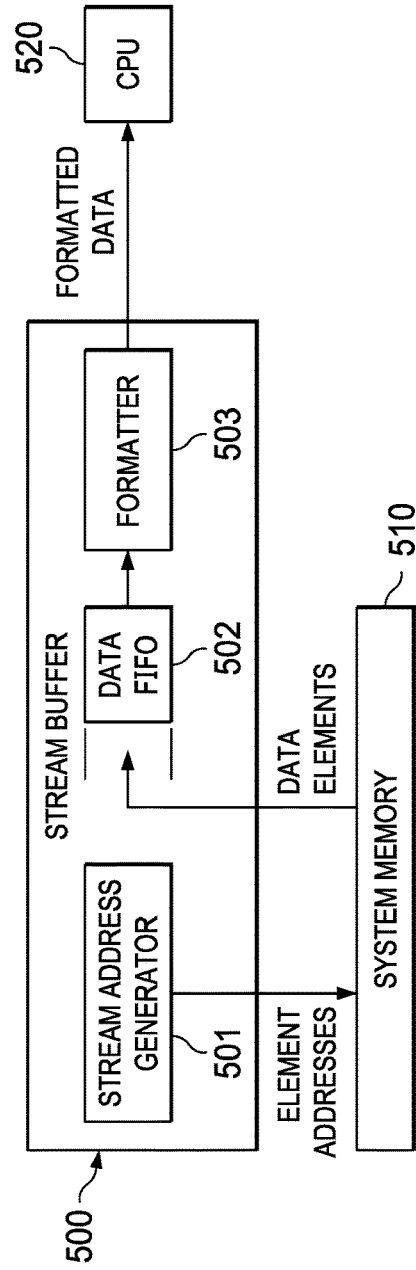
FIG. 5 illustrates a conceptual view of a streaming engine that may be part of the processor of FIG. 1.

FIG. 5 illustrates a conceptual view of the streaming engine 125 of the example processor 100 of FIG. 1. FIG. 5 illustrates the process of a single stream that is representative of each of the two streams that are controlled by streaming engine 125. Streaming engine 500 includes stream address generator 501. Stream address generator 501 sequentially generates addresses of the elements of the stream and supplies these element addresses to system memory 510. Memory 510 recalls data stored at the element addresses (data elements) and supplies these data elements to data first in first out (FIFO) buffer 502. Data FIFO buffer 502 provides buffering between memory 510 and processor 520. Data formatter 503 receives the data elements from data FIFO memory 502 and provides data formatting according to the stream definition. This process will be described in more detail hereinbelow. Streaming engine 500 supplies the formatted data elements from data formatter 503 to the processor 520. A program executing on processor 520 consumes the data and generates an output.

Stream elements typically reside in system memory. The memory does not impose a specific structure upon the stream. Programs define streams and thereby impose structure by specifying the stream attributes such as: address of the first element of the stream; size and type of the elements in the stream; formatting for data in the stream; and the address sequence associated with the stream.

The streaming engine defines an address sequence for elements of the stream in terms of a pointer walking through memory. A multiple level nested loop controls the path the pointer takes. An iteration count for a loop level indicates the number of times that level repeats. A dimension gives the distance between pointer positions of that loop level.

In a basic forward stream, the innermost loop consumes physically contiguous elements from memory. The implicit dimension of this innermost loop is 1 element. The pointer itself moves from element to element in consecutive, increasing order. In each level outside the inner loop, that loop moves the pointer to a new location based on the size of that loop level's dimension. This form of addressing allows programs to specify regular paths through memory in a small number of parameters. Table 1 lists the addressing parameters of a basic stream.

TABLE 1

| Parameter | Definition |
| --- | --- |
| ELEM_BYTES | Size of each element in bytes |
| ICNT0 | Number of iterations for the innermost loop level 0. At loop level 0 all elements are physically contiguous. Implied DIM0 = ELEM_BYTES |
| ICNT1 | Number of iterations for loop level 1 |
| DIM1 | Number of elements between the starting points for consecutive iterations of loop level 1 |
| ICNT2 | Number of iterations for loop level 2 |
| DIM2 | Number of elements between the starting points for consecutive iterations of loop level 2 |
| ICNT3 | Number of iterations for loop level 3 |
| DIM3 | Number of elements between the starting points for consecutive iterations of loop level 3 |
| ICNT4 | Number of iterations for loop level 4 |
| DIM4 | Number of elements between the starting points for consecutive iterations of loop level 4 |
| ICNT5 | Number of iterations for loop level 5 |
| DIM5 | Number of elements between the starting points for consecutive iterations of loop level 5 |

In this example, ELEM_BYTES ranges from 1 to 64 bytes as shown in Table 2.

TABLE 2

| ELEM_BYTES | Stream Element Length |
| --- | --- |
| 000 | 1 byte |
| 001 | 2 bytes |
| 010 | 4 bytes |
| 011 | 8 bytes |
| 100 | 16 bytes |
| 101 | 32 bytes |
| 110 | 64 bytes |
| 111 | Reserved |

The streaming engine fills each vector CPU core 110 fetch with as many elements as the streaming engine can from the innermost stream dimension. If the innermost dimension is not a multiple of the vector length, the streaming engine pads that dimension out to a multiple of the vector length with zeros. As noted below the streaming engine will also mark these lanes invalid. Thus, for higher-dimension streams, the first element from each iteration of an outer dimension arrives in lane 0 of a vector. The streaming engine maps the innermost dimension to consecutive lanes in a vector. For transposed streams, the innermost dimension includes groups of sub-elements along dimension 1, not dimension 0, as transposition exchanges these two dimensions.

Two-dimensional streams exhibit greater variety than one-dimensional streams. A basic two-dimensional stream extracts a smaller rectangle from a larger rectangle. A transposed 2-D stream reads a rectangle column-wise instead of row-wise. A looping stream, where the second dimension overlaps the first dimension, executes a finite impulse response (FIR) filter tap, which loops repeatedly or FIR filter samples which provide a sliding window of input samples.

Figure 6:
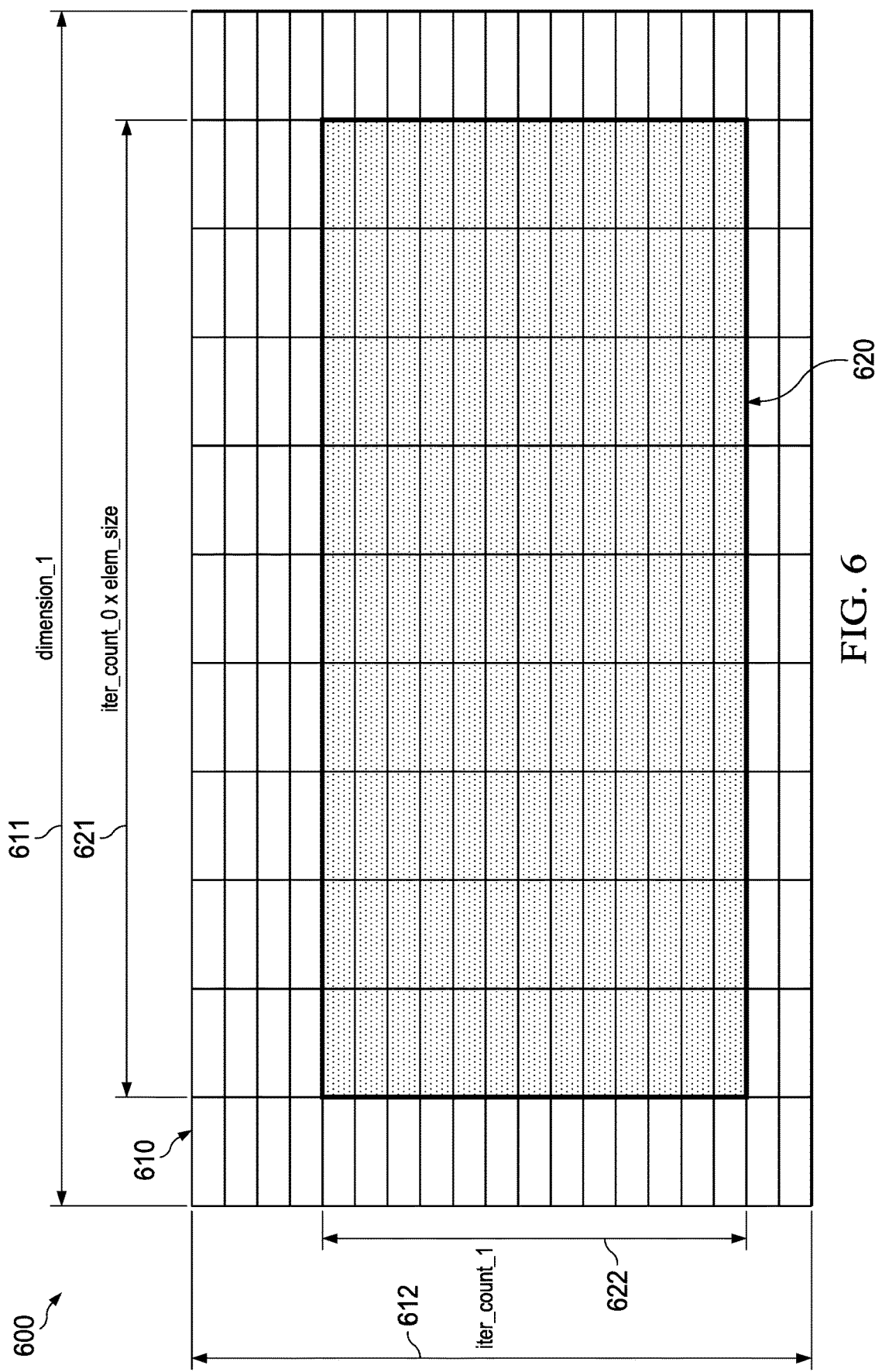
FIG. 6 illustrates a region of memory that may be accessed using a basic two-dimensional stream.

FIG. 6 illustrates a region of memory 600 that may be accessed using a basic two-dimensional stream. The inner two dimensions, represented by ELEM_BYTES, ICNT0, DIM1 and ICNT1 (refer to Table 1) give sufficient flexibility to describe extracting a smaller rectangle 620 having dimensions 621 and 622 from a larger rectangle 610 having dimensions 611 and 612. In this example, rectangle 620 is a 9-by-13 rectangle of 64-bit values and rectangle 610 is a larger 11-by-19 rectangle. The following stream parameters define this stream: ICNT0=9; ELEM_BYTES=8; ICNT1=13; DIM1=88 (11 times 8).

Thus, the iteration count in the 0 dimension 621 is 9. The iteration count in the 1 dimension 622 is 13. Note that the ELEM_BYTES only scales the innermost dimension. The first dimension has ICNT0 elements of size ELEM_BYTES. The stream address generator does not scale the outer dimensions. Therefore, DIM1=88, which is 11 elements scaled by 8 bytes per element.

Figure 7:
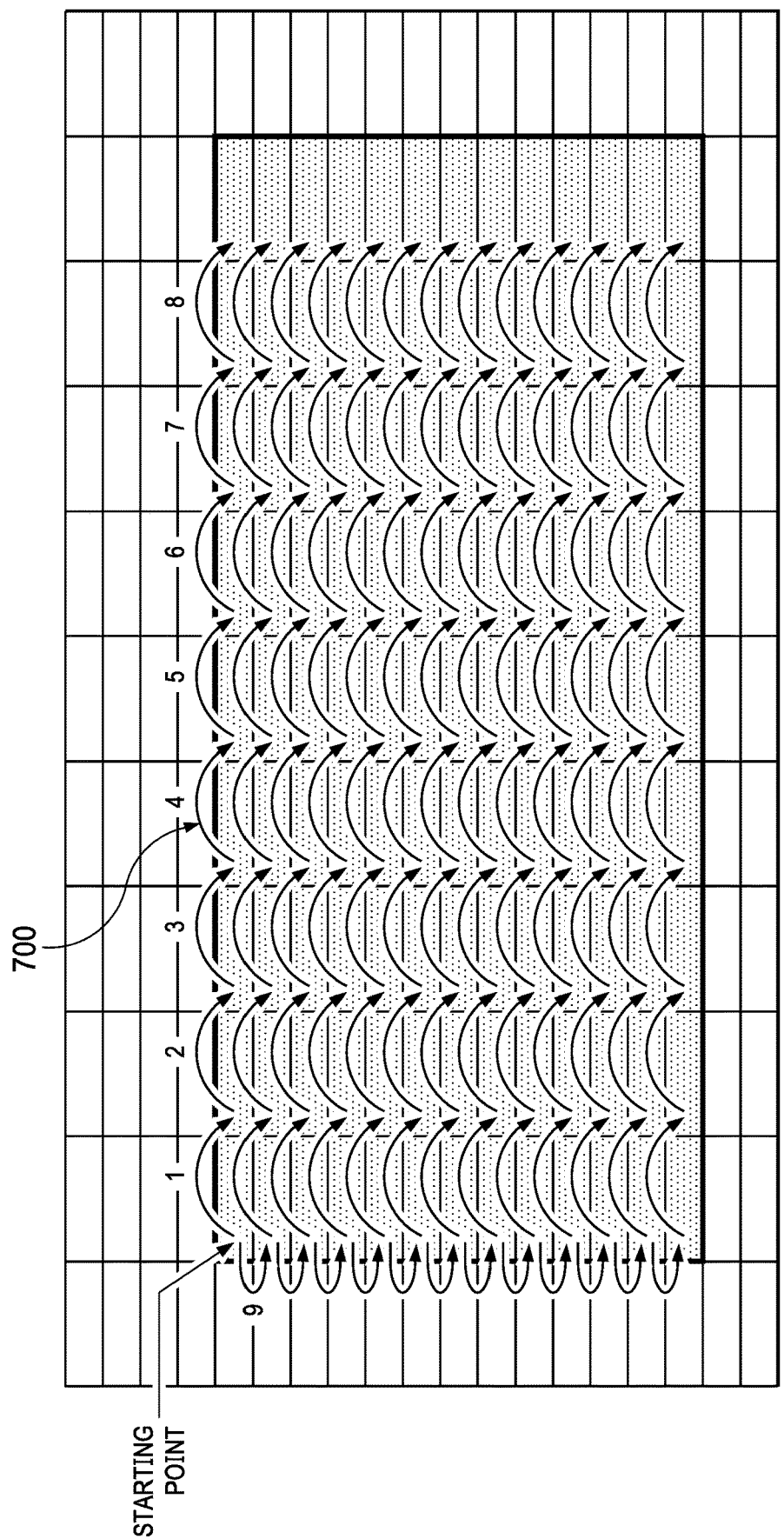
FIG. 7 illustrates the order of elements within the example stream.

FIG. 7 illustrates the order of elements within the example stream of FIG. 6. The streaming engine fetches elements for the stream in the order illustrated in order 700. The first nine elements come from the first row of rectangle 620, left-to-right in hops 1 to 8. The 10th through 18th elements comes from the second row, and so on. When the stream moves from the 9th element to the 10th element (hop 9 in FIG. 7), the streaming engine computes the new location based on the pointer's position at the start of the inner loop, not where the pointer ended up at the end of the first dimension. This makes DIM1 independent of ELEM_BYTES and ICNT0. DIM1 represents the distance between the first bytes of each consecutive row.

Figure 8:
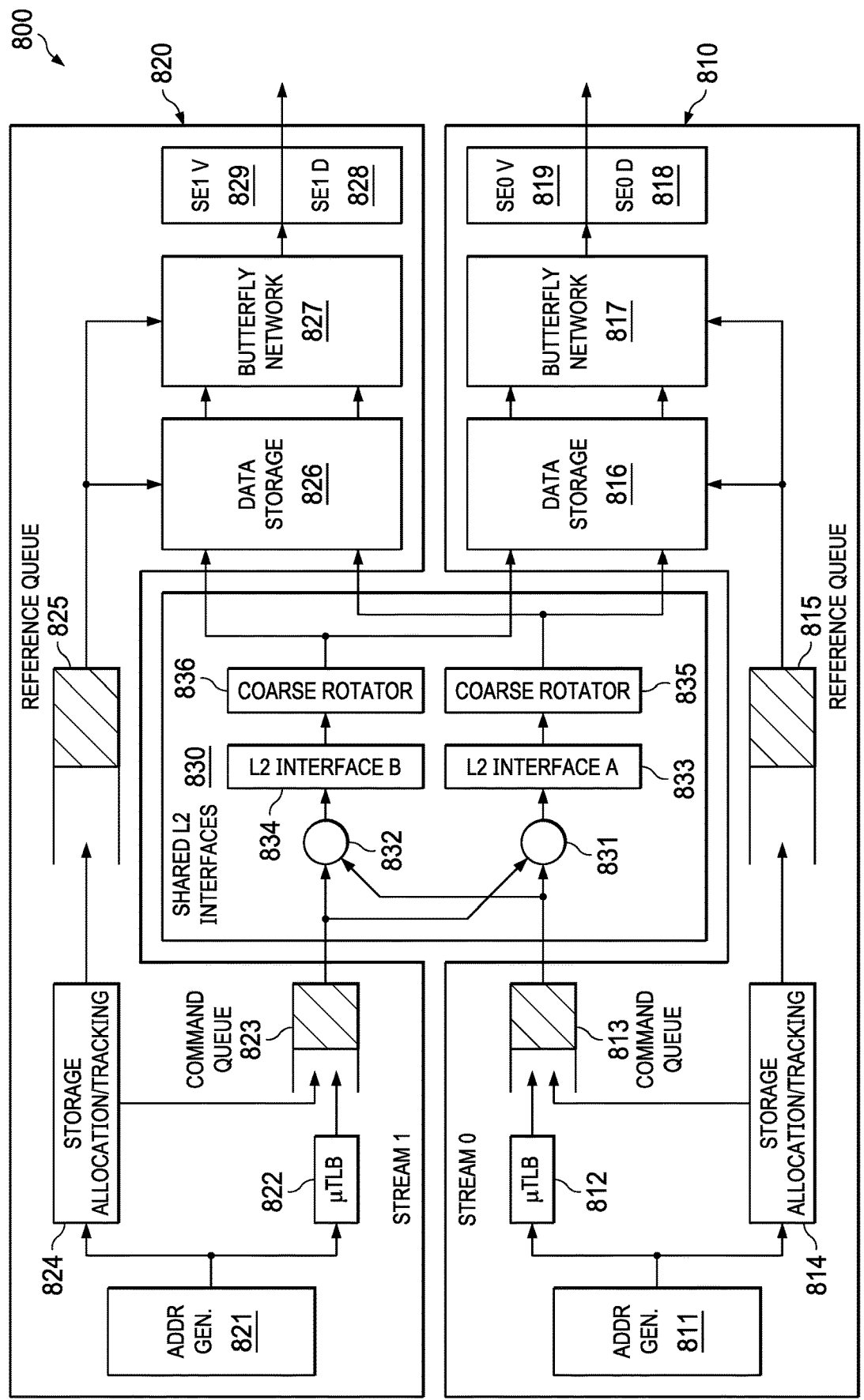
FIG. 8 illustrates the details of the streaming engine.

FIG. 8 illustrates the details of streaming engine 800, which is representative of streaming engine 125 of FIG. 1. Streaming engine 800 contains three major sections: Stream 0 810; Stream 1 820; and Shared L2 Interfaces 830. Stream 0 810 and Stream 1 820 both contain identical hardware that operates in parallel. Stream 0 810 and Stream 1 820 both share L2 interfaces 830. Each stream 810 and 820 provides central processing unit core 110 (FIG. 1) data at a rate of up to 512 bits/cycle, every cycle. The streaming engine architecture enables this through its dedicated stream paths and shared dual L2 interfaces.

Each streaming engine 800 includes a respective dedicated 6-dimensional stream address generator 811/821 that can each generate one new non-aligned request per cycle. Address generators 811/821 output 512-bit aligned addresses that overlap the elements in the sequence defined by the stream parameters. This will be further described hereinbelow.

Each address generator 811/821 connects to a respective dedicated micro table look-aside buffer (μTLB) 812/822. The μTLB 812/822 converts a single 48-bit virtual address to a 44-bit physical address each cycle. Each μTLB 812/822 has 8 entries, covering a minimum of 32 kB with 4 kB pages or a maximum of 16 MB with 2 MB pages. Each address generator 811/821 generates 2 addresses per cycle. The μTLB 812/822 only translates one address per cycle. To maintain throughput, streaming engine 800 takes advantage of the fact that most stream references will be within the same 4 kB page. Thus, the address translation does not modify bits 0 through 11 of the address. If aout0 and aout1 line in the same 4 kB page (aout0 [47:12] are the same aout1[47:12]), then the μTLB 812/822 only translates aout0 and reuses the translation for the upper bits of both addresses.

Translated addresses are queued in respective command queue 813/823. These addresses are aligned with information from the respective corresponding Storage Allocation and Tracking block 814/824. Streaming engine 800 does not explicitly manage μTLB 812/822. A system memory management unit (MMU) invalidates μTLBs as necessary during context switches.

Storage Allocation and Tracking 814/824 manages the stream's internal storage, discovering data reuse and tracking the lifetime of each piece of data (described in greater detail below).

Respective reference queue 815/825 stores the sequence of references generated by the respective corresponding address generator 811/821. This information drives the data formatting network so that it can present data to central processing unit core 110 in the correct order. Each entry in respective reference queue 815/825 contains the information necessary to read data out of data storage 816/826 and align it for central processing unit core 110. Respective reference queue 815/825 maintains the information listed in Table 3 in each slot.

TABLE 3

| | |
| --- | --- |
| Data Slot Low | Slot number for the lower half of data associated with aout0 |
| Data Slot High | Slot number for the upper half of data associated with aout1 |
| Rotation | Number of bytes to rotate data to align next element with lane 0 |
| Length | Number of valid bytes in this reference |

Storage allocation and tracking 814/824 inserts references in reference queue 815/825 as address generator 811/821 generates new addresses. Storage allocation and tracking 814/824 removes references from reference queue 815/825 when the data becomes available and there is room in the stream head registers 818/828. As storage allocation and tracking 814/824 removes slot references from reference queue 815/825 and formats data, it checks whether the references represent the last reference to the corresponding slots. Storage allocation and tracking 814/824 compares reference queue 815/825 removal pointer against the slot's recorded Last Reference. If they match, then storage allocation and tracking 814/824 marks the slot inactive once it is done with the data.

Streaming engine 800 has respective data storage 816/826 for a selected number of elements. Deep buffering allows the streaming engine to fetch far ahead in the stream, hiding memory system latency. The amount of buffering in a given product may vary. In the current example, streaming engine 800 dedicates 32 slots to each stream. Each slot holds 64 bytes of data.

Data storage 816/826, respective storage allocation/tracking logic 814/824, and reference queues 815/825 implement the data FIFO 502 discussed with reference to FIG. 5.

Respective butterfly network 817/827 includes a seven-stage butterfly network. Butterfly network 817/827 receives 128 bytes of input and generates 64 bytes of output. The first stage of the butterfly is actually a half-stage. It collects bytes from both slots that match a non-aligned fetch and merges them into a single, rotated 64-byte array. The remaining six stages form a standard butterfly network. Respective butterfly network 817/827 performs the following operations: rotates the next element down to byte lane 0; promotes data types by a power of two, if requested; swaps real and imaginary components of complex numbers, if requested; converts big endian to little endian depending on the current endian mode of central processing unit core 110. The user specifies element size, type promotion and real/imaginary swap as part of the stream's parameters.

Streaming engine 800 attempts to fetch and format data ahead of central processing unit core 110's demand for it so that it can maintain full throughput. Respective stream head registers 818/828 provide a small amount of buffering so that the process remains fully pipelined. Respective stream head registers 818/828 are not directly architecturally visible, except for the fact that streaming engine 800 provides full throughput. Each stream also has a respective stream valid register 819/829. Valid registers 819/829 indicate which elements in the corresponding stream head registers 818/828 are valid.

The two streams 810/820 share a pair of independent L2 interfaces 830: L2 Interface A (IFA) 833 and L2 Interface B (IFB) 834. Each L2 interface provides 512 bits/cycle throughput direct to the L2 controller for an aggregate bandwidth of 1024 bits/cycle. The L2 interfaces use a credit based multicore bus architecture (MBA) protocol. An example of such a MBA protocol is described in more detail in U.S. Pat. No. 9,904,645, "Multicore Bus Architecture with Non-Blocking High Performance Transaction Credit System," which is incorporated by reference herein. The L2 controller assigns each interface its own pool of command credits. The pool should have sufficient credits so that each interface can send sufficient requests to achieve full read return bandwidth when reading L2 RAM, L2 cache and multicore shared memory controller (MSMC) memory, as described in more detail hereinbelow.

To maximize performance, in this example both streams can use both L2 interfaces, allowing a single stream to send a peak command rate of two requests/cycle. Each interface prefers one stream over the other, but this preference changes dynamically from request to request. IFA 833 and IFB 834 always prefer opposite streams, i.e., when IFA 833 prefers Stream 0, IFB 834 prefers Stream 1 and vice versa.

Respective arbiter 831/832 ahead of each respective interface 833/834 applies the following basic protocol on every cycle it has credits available. Arbiter 831/832 checks if the preferred stream has a command ready to send. If so, arbiter 831/832 chooses that command. Arbiter 831/832 next checks if an alternate stream has at least two requests ready to send, or one command and no credits. If so, arbiter 831/832 pulls a command from the alternate stream. If either interface issues a command, the notion of preferred and alternate streams swap for the next request. Using this algorithm, the two interfaces dispatch requests as quickly as possible while retaining fairness between the two streams. The first rule ensures that each stream can send a request on every cycle that has available credits. The second rule provides a mechanism for one stream to borrow the other's interface when the second interface is idle. The third rule spreads the bandwidth demand for each stream across both interfaces, ensuring neither interface becomes a bottleneck by itself.

Respective coarse grain rotator 835/836 enables streaming engine 800 to support a transposed matrix addressing mode. In this mode, streaming engine 800 interchanges the two innermost dimensions of its multidimensional loop. This accesses an array column wise rather than row wise. Respective rotators 835/836 are not architecturally visible, except as enabling this transposed access mode.

Figure 9:
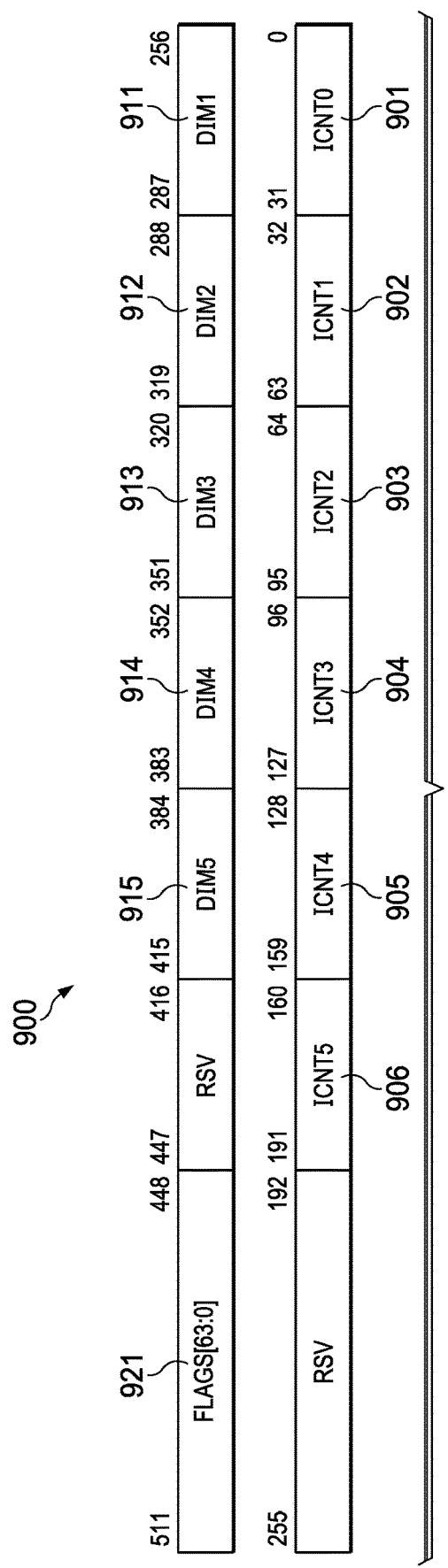
FIG. 9 illustrates an example stream template register.

FIG. 9 illustrates an example stream template register 900. The stream definition template provides the full structure of a stream that contains data. The iteration counts and dimensions provide most of the structure, while the various flags provide the rest of the details. In this example, a single stream template 900 is defined for all data-containing streams. All stream types supported by the streaming engine are covered by this template. The streaming engine supports a six-level loop nest for addressing elements within the stream. Most of the fields in the stream template map directly to the parameters in that algorithm. The numbers above the fields are bit numbers within a 256-bit vector. Table 4 shows the stream field definitions of a stream template.

TABLE 4

| Field Name | FIG. 9 Reference Number | Description | Size Bits |
| --- | --- | --- | --- |
| ICNT0 | 901 | Iteration count for loop 0 | 32 |
| ICNT1 | 902 | Iteration count for loop 1 | 32 |
| ICNT2 | 903 | Iteration count for loop 2 | 32 |
| ICNT3 | 904 | Iteration count for loop 3 | 32 |
| ICNT4 | 905 | Iteration count for loop 4 | 32 |
| INCT5 | 906 | Iteration count for loop 5 | 32 |
| DIM1 | 911 | Signed dimension for loop 1 | 32 |
| DIM2 | 912 | Signed dimension for loop 2 | 32 |
| DIM3 | 913 | Signed dimension for loop 3 | 32 |
| DIM4 | 914 | Signed dimension for loop 4 | 32 |
| DIM5 | 915 | Signed dimension for loop 5 | 32 |
| FLAGS | 921 | Stream modifier flags | 64 |

Loop 0 is the innermost loop and loop 5 is the outermost loop. In the current example DIM0 is always equal to is ELEM_BYTES defining physically contiguous data. Thus, the stream template register 900 does not define DIM0. Streaming engine 2800 interprets all iteration counts as unsigned integers and all dimensions as unscaled signed integers. An iteration count at any level (ICNT0, ICNT1, ICNT2, ICNT3, ICNT4 or ICNT5) indicates an empty stream. Each iteration count must be at least 1 to define a valid stream. The template above fully specifies the type of elements, length and dimensions of the stream. The stream instructions separately specify a start address. This would typically be by specification of a scalar register in scalar register file 211 which stores this start address. This allows a program to open multiple streams using the same template but different registers storing the start address.

The central processing unit 110 (FIG. 1) exposes the streaming engine 800 (FIG. 8) to programs through a number of assembly instructions and specialized registers. For example, a SEOPEN instruction opens a stream. The SEOPEN instruction may specify a stream number indicating opening stream 0 or stream 1. The SEOPEN instruction may specify a data register storing the start address of the stream. The SEOPEN instruction may also specify a template defining a stream of data for the streaming engine to retrieve from memory. In executing the SEOPEN instruction, the corresponding streaming engine begins to prepare operations and may start fetching data from L2 memory. Once open, an instruction can reference the streaming engine data using a SE0 or SE1 instruction. The SE0 and SE1 instruction causes streaming engine data to be supplied from the last referenced address. For example, a SE0 immediately following an SEOPEN will supply the streaming engine data at the base address, but does not advance the address. An SE0++ or SE1++ instruction causes streaming engine data to be supplied from the last referenced address and then advances the address sequentially based on the template.

As discussed with respect to FIG. 1, a processor may include multiple levels of cache, such as a L1D cache 123 and L2 cache 130. In certain cases, the streaming engine 125 may obtain data from the L2 cache 130. After processing by the processor, data is written out, but does not output data to the L2 cache 130 directly, but rather via the L1D cache 123. As the streaming engine 125 may be decoupled from the processor core 110 there may be ambiguity if the streaming engine attempts to access a data address after a data write from the processor to that same data address. For example, the processor may execute a STORE instruction followed by an SEOPEN instruction. In certain cases, the STORE instruction may attempt to store data into a memory address that would be accessed as a part of the SEOPEN instruction. As discussed above, the processor first writes outputs to the L1D cache, which then writes to the L2 cache. As the streaming engine can prefetch data directly from the L2 cache, the SEOPEN instruction may cause the streaming engine 125 to begin accessing data from the L2 cache. This potentially sets up a race condition between the time the data from the STORE instruction is written to the memory address in the L2 cache and when the SEOPEN instruction attempts to access the data in the same memory address in the L2 cache.

Rather than attempting to analyze the STORE command and then accessing both the L1D cache and the L2 cache to send data to the streaming engine, or otherwise imposing a load/store architecture on the streaming engine, an implicit memory fence may be defined based on the streaming engine opening a stream. This implicit memory fence provides a guarantee that a store operation to an address will complete before a subsequent access to the address by the streaming engine. However, the reverse, e.g., a SEOPEN followed by a STORE to the same address, is not guaranteed and it is ambiguous as to what value will be in the address when accessed by the SEOPEN.

The memory fence operation may be performed when a SEOPEN instruction is executed by checking the L1D to see if there are any outstanding writes for data stored in the L1D that have not been written to the L2 cache. When the SEOPEN command is received, a pipeline controller of the processor sends the command to the streaming engine and then stalls on the command until the streaming engine starts to return data. The pipeline controller checks with the L1D memory controller to see if there are any outstanding or pending L2 writes. If there are outstanding or pending L2 writes, the streaming engine stalls waiting for the L2 writes to complete before the streaming engine starts to pre-fetch data from L2 and return data to the CPU. After the L1D sends data to the L2 memory controller, the L2 memory controller sends back an acknowledgement to the L1D indicating that the L2 cache has consumed the data. The L1D memory controller tracks which data has not yet been sent to the L2 along with outstanding write requests and completed write requests.

Stalling the processor and streaming engine every time to wait for writes to be committed from the L1D cache can be expensive and unnecessary when a program tries to issue a set of writes, but it is not necessary for the writes to be visible to the streaming engine. According to certain aspects, a memory tag may be used to help fence one or more commands together. For example, a set of stream-open and stream-write operations may be tagged with a color value based on a processor register field. As used herein, a color value refers to an identifier that may be associated with a set of memory operations to help group or otherwise organize the set of memory operations. Each memory transaction may include a source field comprising a set of one or more bits that encode the color value associated with the memory transaction. Where multiple color values are used, the streaming engine can receive multiple signals from the L1D memory controller, indicating whether there are any pending writes associated with a particular color value. If there are pending writes associated with a specified color value, then the streaming engine can be stalled waiting for those pending writes to complete. If there are pending writes associated with a color value different from the specified color value, then execution proceeds without stalling.

In certain cases, memory tags may be used in conjunction with implicit memory fences. For example, a color value associated with a stream-open command may be passed to the streaming engine. When the stream-open command is executed by the streaming engine, the associated color value may be passed to the L1D memory controller and checked against color values associated with pending writes. If there are pending writes with a matching color value, then the streaming engine can be stalled until the pending writes are completed. If there are no pending writes with a matching color value, then execution proceeds without stalling.

The color value is based on a k value provided by a processor register field, such as a task state register (TSR) field. This processor register field is read by every load and store operation to determine the color value associated with the memory operation. According to certain aspects, the TSR may be included as a part of a set of control registers, such as control registers 114 of FIG. 1. Two or more color values may be available. According to certain aspects an instruction, such as a MTAG instruction may be provided to programmatically adjust the processor register field, and thus color value, based on an argument provided with the MTAG instruction. The color value may be adjusted, for example, by either directly assigning a color value, jumping to the next color value, or flipping the color value. Once the color value is adjusted, memory operations in the next execute packet may be tagged with the adjusted color value.

Generally, the instruction fetch pipeline may be programmatically stalled while certain memory operations with the same color value are completed. In some cases, multiple memory fencing behaviors may be supported. For example, a MFENCE k command may stall the instruction fetch pipeline until all pending load and store operations with the same color value are completed. The k argument may define the specific color value, such that when k=00000b, the instruction fetch pipeline is stalled until all memory transactions with color value=0 complete. Likewise, when k=00001b, the instruction fetch pipeline is stalled until all memory transactions with color value=1 complete. Additionally, when k=11111b, the instruction fetch pipeline is stalled until all memory transactions, regardless of memory tag color, are completed. A second command, MFENCEST k may stall the instruction fetch pipeline until all pending store operations, but not load operations, with the color value specified by k are completed. The k argument for MFENCEST may be operationally similar to MFENCE and when k=00000b or k=00001b, the instruction fetch pipeline will stall until all store transactions with color value=0 or 1 are completed, respectively. Similarly, when k=11111b, the instruction fetch pipeline is stalled until all store transactions, regardless of memory tag color, are completed.

Figure 10:
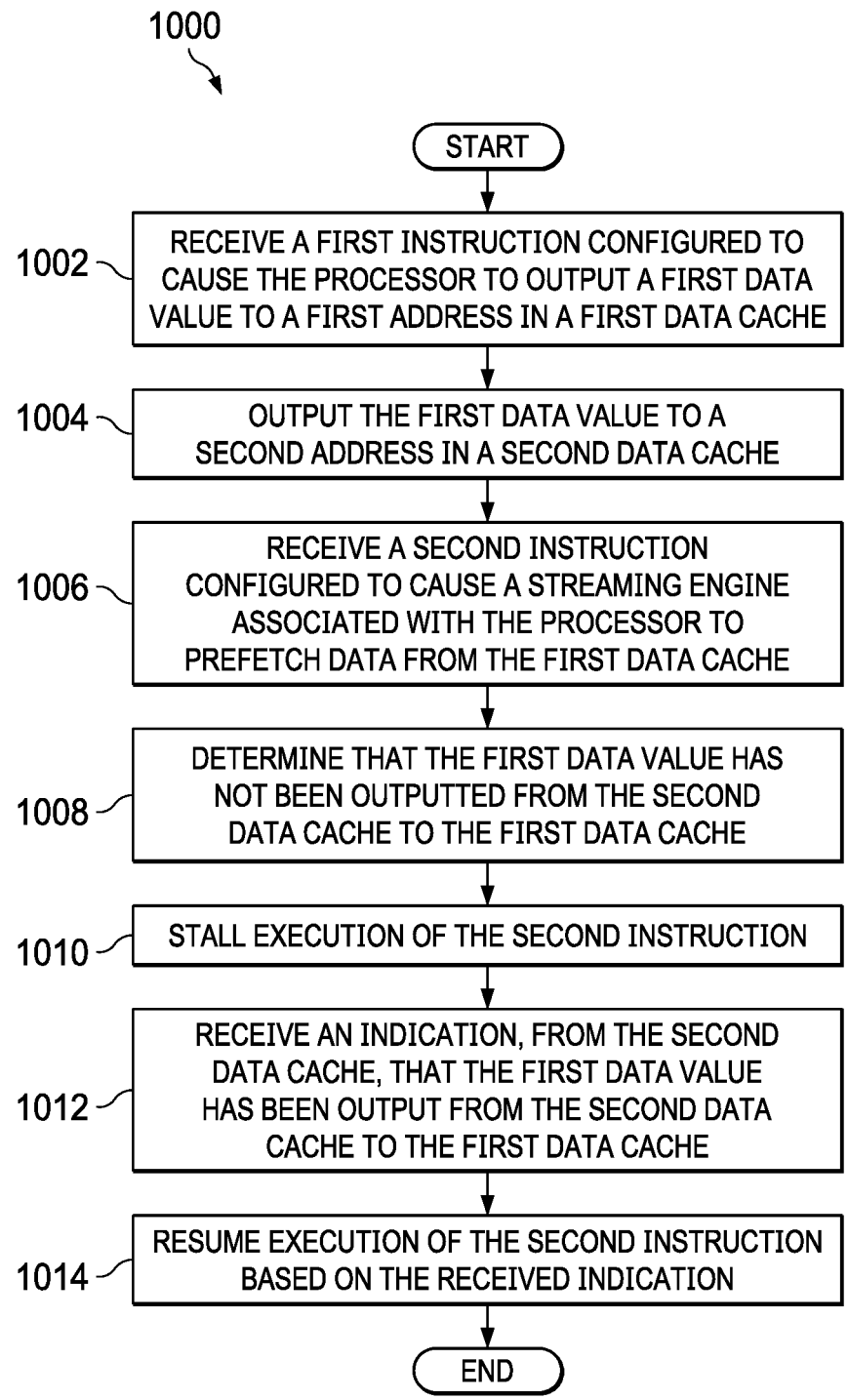
FIG. 10 is a flow diagram illustrating a technique for executing a plurality of instructions by a processor, in accordance with aspects of the present disclosure.

FIG. 10 is a flow diagram 1000 illustrating a technique for executing a plurality of instructions by a processor, in accordance with aspects of the present disclosure. At block 1002, a first instruction is received. The first instruction is configured to cause the processor to output a first data value to a first address in a first data cache. For example, the processor may receive a STORE instruction to store a value in L2. At block 1004, the processor outputs the first data value to an address in a second data cache. For example, the processor may be coupled to the L2 cache via the L1D cache and the processor outputs the data value to the L1D cache. At block 1006, the processor receives a second instruction configured to cause a streaming engine associated with the processor to prefetch data from the first data cache. For example, the processor may receive a SEOPEN instruction telling the streaming engine to begin fetching data from L2. At block 1008, the processor determines that the first data value has not been outputted from the second data cache to the first data cache. For example, a check may be performed with the L1D memory controller to verify whether there are any outstanding or pending L2 writes. At 1010, execution of the second instruction may be stalled, for example, by inserting no-op instructions into the pipeline. At block 1012, the pipeline controller receives an indication, from the second data cache, that the first data value has been outputted from the second data cache to the first data cache. For example, the L1D memory controller may receive an acknowledgment that the L2 cache has written the data. At block 1014, the pipeline controller resumes execution of the second instruction based on the received indication.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A processor comprising:
a cache hierarchy that includes:
a first cache having a first level and that includes a memory controller; and
a second cache having a second level;
a streaming engine coupled to the second cache via a data path that does not include the first cache; and
a pipeline controller coupled to the first cache and to the streaming engine and configured to:
receive a first instruction associated with a write of a first set of data to the first cache, wherein the first instruction includes a field that associates the first instruction with a first group;
cause the first instruction to be performed by providing the first set of data to the first cache;
receive a second instruction associated with an access of a second set of data stored in the second cache via the streaming engine, wherein the second instruction includes a field that associates the second instruction with the first group;
determine, based on the first instruction and the second instruction being associated with the first group, whether the second cache has been updated based on the write of the first instruction by providing, to the memory controller of the first cache, a value in the field of the first instruction that associates the first instruction with the first group; and
cause the second instruction to be performed using the streaming engine after the second cache has been updated based on the write of the first instruction.

2. The processor of claim 1 further comprising a task state register, wherein the first instruction and the second instruction are associated with the first group based on a value stored in the task state register.

3. The processor of claim 2, wherein the processor is configured to:
receive a tag instruction; and
update the value stored in the task state register based on the tag instruction.

4. The processor of claim 1, wherein the first instruction and the second instruction are associated with the first group based on the first instruction and the second instruction being in a same execute packet.

5. The processor of claim 1, wherein the pipeline controller is configured to determine whether the second cache has been updated based on the write of the first instruction based on whether the first set of data has been provided from the first cache to the second cache.

6. The processor of claim 1, wherein the first cache includes a level-one (L1) cache and the second cache includes a level-two (L2) cache.

7. The processor of claim 1, wherein the first cache includes a level-one data (L1D) cache and the second cache includes a level-two (L2) cache.

8. The processor of claim 1, wherein the pipeline controller is configured to cause the second instruction to be performed using the streaming engine after the second cache has been updated based on the write of the first instruction by inserting a set of no-op instructions.

9. The processor of claim 1, wherein the pipeline controller is further configured to:
receive a third instruction, wherein the third instruction includes a field that includes a predetermined value; and
determine, based on the third instruction including the predetermined value, whether the second cache has been updated based on all pending instructions regardless of group.

10. The processor of claim 1, wherein:
the first instruction is a store instruction; and
the second instruction is a stream open instruction.

11. A method comprising:
receiving a first instruction that is associated with a write to a first cache, wherein:
the first instruction includes a value that specifies that the first instruction is associated with a first group; and
the first cache includes a memory controller;
performing the first instruction on the first cache;
receiving a second instruction that is associated with an access of a second cache that is higher in a memory hierarchy than the first cache, wherein:
the second instruction is associated with the first group; and
the second instruction is to be performed via a data path that does not include the first cache;
determining, based on the first instruction and the second instruction being associated with the first group, whether the second cache has been updated based on the write of the first instruction by providing the value to the memory controller; and
performing the second instruction on the second cache after the second cache has been updated based on the write of the first instruction.

12. The method of claim 11, wherein the first instruction and the second instruction are associated with the first group based on a value stored in a processor task state register.

13. The method of claim 12 further comprising:
receiving a third instruction; and
updating the value stored in the processor task state register based on the third instruction.

14. The method of claim 11, wherein the first instruction and the second instruction are associated with the first group based on the first instruction and the second instruction being in a same execute packet.

15. The method of claim 11, wherein the determining of whether the second cache has been updated based on the write of the first instruction includes determining whether data associated with the first instruction has been provided from the first cache to the second cache.

16. The method of claim 11, wherein the first cache includes a level-one (L1) cache and the second cache includes a level-two (L2) cache.

17. The method of claim 11, wherein the first cache includes a level-one data (L1D) cache and the second cache includes a level-two (L2) cache.

18. The method of claim 11, wherein the performing of the second instruction on the second cache after the second cache has been updated based on the write of the first instruction includes inserting a set of no-op instructions prior to the second instruction.

19. The method of claim 11 further comprising:
receiving a third instruction, wherein the third instruction includes a field that includes a predetermined value; and
determining, based on the third instruction including the predetermined value, whether the second cache has been updated based on all pending instructions regardless of group.

20. The method of claim 11, wherein the access of the second cache by the second instruction includes a prefetch of data from the second cache.

* * * * *